United States Patent [19]

Shimamoto

[11] 4,010,379
[45] Mar. 1, 1977

[54] SAFETY DEVICE FOR A MOTORCYCLE
[75] Inventor: Takeshi Shimamoto, Akashi, Japan
[73] Assignee: Kawasaki Jukogyo Kabushiki Kaisha, Japan
[22] Filed: Dec. 15, 1975
[21] Appl. No.: 640,762
[30] Foreign Application Priority Data
Dec. 20, 1974 Japan .............................. 49-155331
[52] U.S. Cl. .................................. 307/9; 280/293; 200/61.58 R; 180/30
[51] Int. Cl.² .......................................... B60L 1/00
[58] Field of Search ............. 307/9, 10 R; 280/293; 180/103 R, 30, 82 R; 340/52 R, 134, 64, 63, 65; 200/61.58; 317/9 B

[56] References Cited
UNITED STATES PATENTS
3,918,743  11/1975  Sato et al. .......................... 280/293

Primary Examiner—Robert K. Schaefer
Assistant Examiner—Morris Ginsburg
Attorney, Agent, or Firm—McGlew and Tuttle

[57] ABSTRACT

The device comprises a switch adapted to break the ignition circuit of a motorcycle and turn on a lamp when the motorcycle stand is in an operative position. A neutral switch is closed when the transmission is brought to a neutral position, and the engine starting circuit and the ignition circuit are simultaneously completed in synchronism with the closing of the neutral switch. A clutch switch can complete the engine starting circuit independently of the operation described above.

5 Claims, 1 Drawing Figure

SAFETY DEVICE FOR A MOTORCYCLE

BACKGROUND OF THE INVENTION

This invention relates to a safety device for a motorcycle.

In driving a motorcycle, the driver may start up the motorcycle without positively bringing the motorcycle stand to an inoperative position or with the motorcycle stand being inadvertently left in an operative position. If this is the case, there is the danger of the motorcycle stand striking a projecting object, causing the motorcycle to overturn on the road and exposing the driver to injury. Also, if the starting switch is inadvertently operated when the transmission is in a position other than a neutral position, there are possibilities of the motorcycle overturning.

SUMMARY OF THE INVENTION

An object of this invention is to provide a safety device for a motorcycle which is effective to prevent the engine from starting when the motorcycle stand is in an operative position and to immediately stop the engine when the motorcycle stand is inadvertently moved to an operative position while the motorcycle is in operation.

Another object of the invention is to provide a safety device for a motorcycle which permits the idling of the engine or the starting of the engine in the neutral position of the transmission independent on the position of the motorcycle stand.

A further object of the invention is to provide a safety device for a motorcycle which is effective to prevent the starter motor from being rendered operative if the driver inadvertently tries to actuate the same when the transmission is in a position other than a neutral position.

A still further object of the invention is to provide a safety device for a motorcycle which permits the starter switch to be operated when the clutch lever is gripped even if the transmission is in a position other than a neutral position.

In one aspect of the invention, there is provided a safety device for a motorcycle comprising an ignition circuit composed of a primary winding of an ignition coil and a circuit breaker and connected in parallel with a battery through a main switch, a motorcycle stand switch connected in series with the ignition circuit and adapted to break the ignition circuit when a motorcycle stand is in an operative position and to complete the ignition circuit when the motorcycle stand is in an inoperative position, and a first electronic switching element connected in parallel with the motorcycle stand switch, the first electronic switching element being brought to an on state by means of a neutral switch only when a transmission is in a neutral position.

BRIEF DESCRIPTION OF THE DRAWING

The single FIGURE is a circuit diagram of the safety device for a motorcycle comprising one embodiment of the invention.

DESCRIPTION OF THE PREFERRED EMBODIMENT

Figure 1:
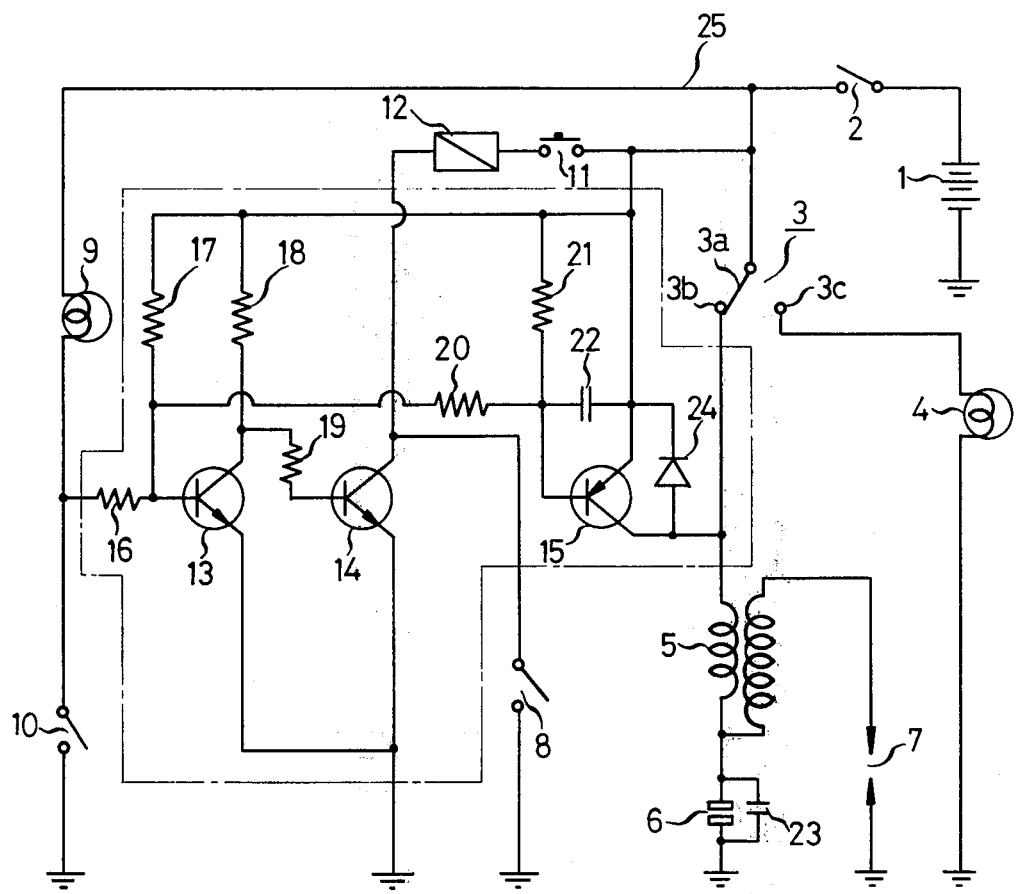

In FIG. 1, 1 is a battery, 2 a main switch, 3 a motorcycle stand switch, and 4 a motorcycle stand warning lamp. The motorcycle stand switch 3 includes a movable contact 3a and fixed contacts 3b and 3c, the movable contact 3a being brought into engagement with the fixed contact 3b when a motorcycle stand is in an inoperative position and with the fixed contact 3c when the motorcycle stand is in an operative position. 5 is an ignition coil, 6 a circuit breaker and 7 a spark plug connected to a secondary winding of the ignition coil.

9 is a neutral lamp, and 10 a neutral switch which is closed when a transmission is in a neutral position. 11 is a starter switch, and 12 a relay for a solenoid for a starter motor. 13, 14 and 15 are transistors. 16, 17, 18, 19, 20 and 21 are resistors. 22 and 23 are capacitors. 24 is a diode, and 8 a clutch switch which is closed when a clutch lever is gripped (a clutch is disengaged).

The transistors 13 and 14 are grounded through their emitters. The transistor 13 includes a collector which is connected to a positive bus 25, connected to the battery 1, through the resistor 18, while the transistor 14 includes a collector which is connected to the bus 25 through the relay 12 and starter switch 11. The transistor 13 has a base which is connected to the bus 25 through a series circuit composed of the resistor 16 and the lamp 9. The base of transistor 13 is also connected to the bus 25 through the resistor 17. Thus a positive bias voltage is impressed on the base of transistor 13 to bring the transistor 13 to an on state. The transistor 14 has a base which is connected to the collector of transistor 13 through the resistor 19. Thus the base of transistor 14 has a potential which is low enough to bring the transistor 14 to an off state. If the neutral switch 10, mounted between the junction of the lamp 9 and resistor 16 and the ground, is closed, or if the transmission is brought to the neutral position, the potential of the base of the transistor 13 is lowered and the transistor 13 is brought to an off state. Accordingly, the transistor 14 can be brought to an on state when the starter switch 11 is closed.

The clutch switch 8 is connected between the collector of transistor 14 and the ground. Thus, the relay 12 can be actuated by closing the starter switch 11, independently of the switching operation of transistor 14, when the clutch switch 8 is closed or when the clutch is disengaged.

The transistor 15 includes a collector connected to a primary winding of the ignition coil 5, and an emitter connected to the bus 25. The transistor 15 has a base connected to the bus 25 through a resistor 21 and to the base of the transistor 13 through a resistor 20. Thus, when the neutral switch 10 is closed, a positive bias voltage is impressed on the base of transistor 15 to bring the transistor 15 to an on state as is the case with the transistor 14 in the starter circuit. 22 is an oscillation preventing capacitor, and 24 a free wheel diode.

The operation of the device constructed as aforementioned will now be described. Let us assume that the motorcycle stand is in its operative position and the transmission is in its neutral position when the motorcycle is at rest. If this is the case, the movable contact 3a of the motorcycle stand switch 3 is in engagement with the fixed contact 3c and the warning lamp 4 is on. Also, since the neutral switch 10 is closed, the neutral lamp 9 is on. At this time, the base of transistor 13 is almost grounded, so that the transistor 13 is in an off state. This permits a sufficiently high bias voltage to be impressed on the base of transistor 14 to saturate the transistor 14. Therefore, if the starter switch 11 is turned on at this stage, the solenoid relay 12 is actuated and the starter motor begins to rotate. Meanwhile the transistor 15 is saturated because a positive bias voltage is impressed thereon, so that a current flows through the transistor 15 to the ignition coil 5, thereby starting the engine.

Let us now consider the starting up of the motorcycle. If the clutch lever is gripped and the transmission is brought to a low position, the clutch switch 8 is closed since the clutch lever is gripped and the neutral switch 10 is opened because the transmission is switched from the neutral to the low position. This brings the transistors 14 and 15 to an off state. If this operation is performed when the movable contact 3a is in engagement with the fixed contact 3c, or when the motorcycle stand is in an operative position, the transistor 15 is turned off at the time the neutral switch 10 is opened, so that no current flows through the ignition coil 5 and the engine stops. If the transmission is brought to its low position after the motorcycle stand is moved to its inoperative position, the motorcycle stand switch 3 is actuated to bring the movable contact 3a into engagement with the fixed contact 3b, thereby supplying a current to the ignition coil 5 to enable the engine to continue to run.

In case the motorcycle stand is accidentally moved to its operative position while the motorcycle is in operation, the movable contact 3a of the motorcycle stand switch 3 is automatically brought into engagement with the fixed contact 3c. This turns on the warning lamp 4 and at the same time breaks the ignition circuit, thereby stopping the engine.

If the motorcycle stand is moved to its operative position without bringing the transmission to the neutral position after the motorcycle is brought to a stop, the engine immediately stops. This is conducive to prevention of the motorcycle accidentally starting up and overturning as the driver inadvertently releases the clutch lever and the clutch is engaged.

The aforesaid operations are shown in Table 1. In the neutral column of Table 1, the symbol ○ indicates that the transmission is in the neutral position and the symbol × indicates that the transmission is in a position other than the neutral position. The symbol ○ in the motorcycle stand column indicates that the motorcycle stand is in the inoperative position, while the symbol × indicates that the motorcycle stand is in the operative position. The symbol ○ in the clutch column indicates that the clutch is engaged, while the symbol × indicates that the clutch is disengaged. The symbol ○ in the starter motor column indicates that the starter motor is capable of energization, while the symbol × indicates that the starter motor is not capable of energization. The symbol ○ in the engine column indicates that the engine can be started, while the symbol × indicates that the engine cannot be started.

Table 1

| Condition of Motorcycle | At Rest | | | | At Rest and Starting | | At Rest and in Operation | In Operation |
|---|---|---|---|---|---|---|---|---|
| Neutral | ○ | ○ | ○ | ○ | × | × | × | × |
| Motorcycle Stand | × | × | ○ | ○ | ○ | × | × | ○ |
| Clutch | × | ○ | × | ○ | ○ | ○ | × | × |
| Starter Motor | ○ | ○ | ○ | ○ | ○ | ○ | × | × |
| Engine | ○ | ○ | ○ | ○ | ○ | × | × | ○ |

From the foregoing description, it will be appreciated that the safety device according to this invention enables to positively avoid the danger to which the driver of a motorcycle might be exposed when he starts up the motorcycle or operates the same while the motorcycle stand is in its operative position. By adopting the construction shown in FIG. 1, it is also possible to avoid the occurrence of an accident which would otherwise be caused by inadvertently actuating the starter motor when the transmission is in a position other than the neutral position.

I claim:

1. A safety device for a motorcycle having a stand movable between operative and inoperative positions, said safety device comprising, in combination, an ignition circuit composed of a primary winding of an ignition coil and a circuit breaker; a battery; a main switch connected to said battery and operable to connect said ignition circuit in parallel with said battery; a motorcycle stand switch connected in series with said ignition circuit and said main switch and operable to break said ignition circuit when the motorcycle stand is in an operative position and to complete the ignition circuit when the motorcycle stand is an in inoperative position; a first electronic switching element connected in parallel with said motorcycle stand switch; a neutral switch connected in parallel with said battery through said main switch and operable to an operative position only when a transmission is in the neutral position; and circuit means connecting said neutral switch to said first electronic switching element and operable, responsive to said neutral switch being operated to its operative position, to bring said first electronic switching element to an on state.

2. A safety device as claimed in claim 1, wherein said motorcycle stand switch is a bipolar switch; and a warning lamp connected to said bipolar switch and energized responsive to movement of said bipolar switch to a position breaking said ignition circuit responsive to said motorcycle stand being moved to its operative position.

3. A safety device, as claimed in claim 1, further comprising a starter circuit, composed of a starter switch and a relay for a solenoid for a starter motor, connected in parallel with said battery through said main switch; and a clutch switch disposed in said starter circuit and adapted to close when a clutch is disengaged.

4. A safety device, as claimed in claim 1, further comprising a starter circuit, composed of a starter switch and a relay for energizing the solenoid for a starter motor, connected in parallel with said battery through said main switch; and a second electronic switching element connected in parallel with said motorcycle stand switch through said starter circuit; said circuit means further connecting said neutral switch to said second electronic switching element and being operable, responsive to said neutral switch being operated to its operative position, to bring said second electronic switching element to an off state.

5. A safety device, as claimed in claim 4, further comprising a clutch switch connected in parallel with said second electronic switching element and adapted to close when a clutch is disengaged.

* * * * *